Jan. 18, 1966 R. A. LINDER 3,230,397
BROADBAND VIDEO FREQUENCY SWITCHING CIRCUIT
Filed Nov. 26, 1963
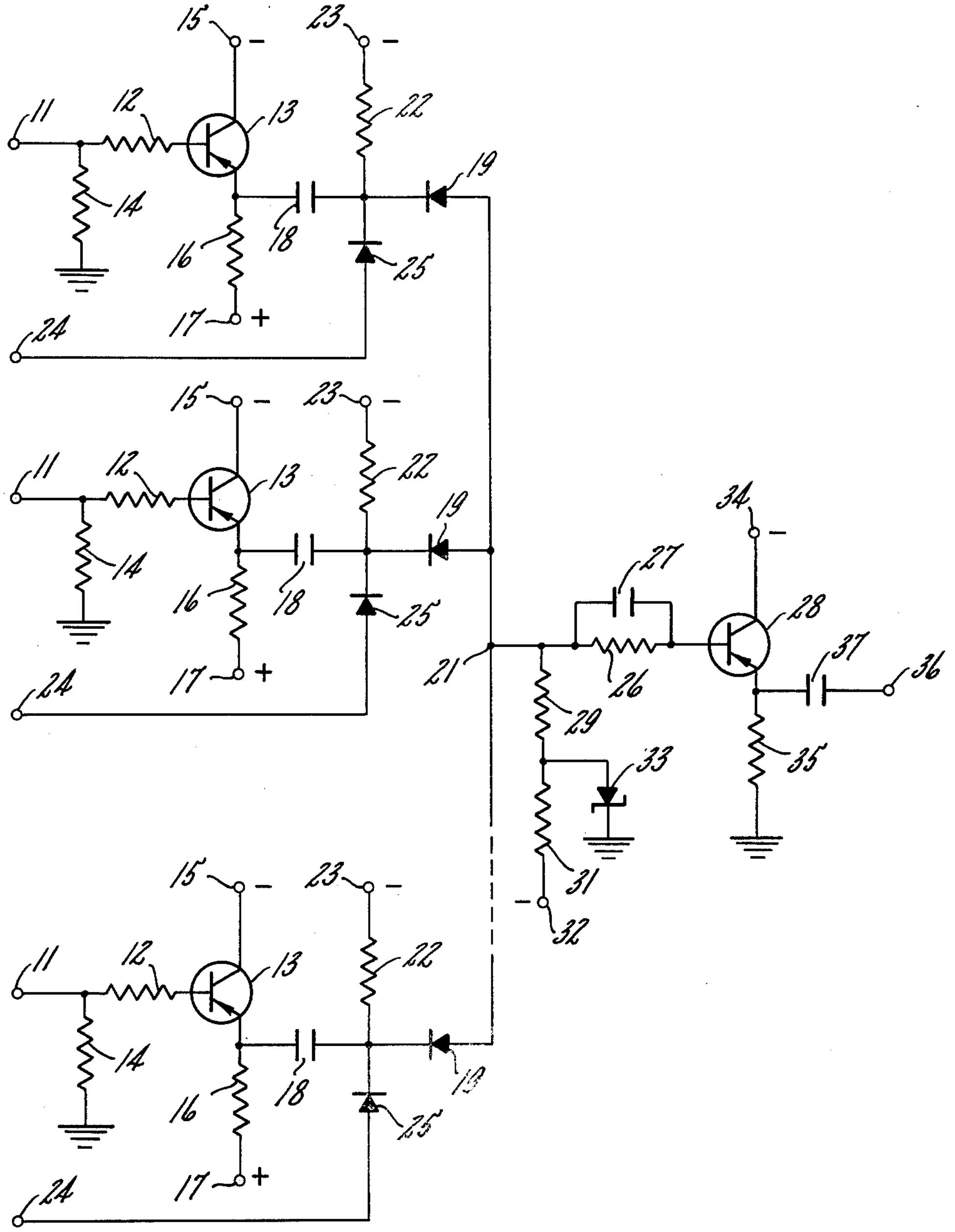
INVENTOR.
Richard A. Linder,
BY
H. H. Losche
Att'ys.

3,230,397

BROADBAND VIDEO FREQUENCY SWITCHING CIRCUIT

Richard A. Linder, Baltimore, Md., assignor, by mesne assignments, to the United States of America as represented by the Secretary of the Navy Filed Nov. 26, 1963, Ser. No. 326,307
5 Claims. (Cl. 307—88.5)

The present invention is generally related to electronic switching circuitry and more specifically to a multi-input, broadband video frequency switch to be controlled by standard logic signals.

In designing certain radar receiving equipment, a need has arisen for a basic video switch capable of independently controlling and switching any one of several video input channels to a common output channel while maintaining a usable overall bandwidth of at least 100 megacycles. In this particular equipment, it is necessary to provide for at least eight input channels, only one of which may be "ON," or coupled to the output channel, at any particular time. The insertion loss of any single channel, when in an "ON" condition must not be greater than four decibels, and when in an "OFF" condition must not be less than 35 decibels. The switch must be capable of utilizing standard logic signals for placing each input channel in either an "ON" or an "OFF" condition, and must have input and output impedances of approximately 50 ohms.

No device was known prior to the present invention which could satisfactorily fulfill these requirements. One of the most difficult problems involved is that of coupling several channels to a common output channel, controlling each one independently, and yet maintaining an overall usable bandwith of 100 megacycles. The present invention fulfills these requirements.

An object of the present invention is the provision of a solid state video frequency switching circuit.

Another object is to provide a broadband video frequency switching circuit.

A further object of the invention is the provision of a broadband, solid state, video frequency switching circuit having multiple input channels and a single output channel.

Still another object is to provide a multi-input, broadband video frequency switching circuit capable of being controlled by standard logic signals.

Yet another object of the present invention is the provision of a broadband, solid state, video frequency switching circuit having multiple input channels and a single output channel, and being capable of control by standard logic signals.

Other objects and many of the attendant advantages of this invention will be readily appreciated as the same becomes better understood by reference to the following detailed description of a preferred embodiment of the invention as schematically illustrated in the accompanying figure of drawing.

Referring now to the figure of drawing there is shown a specific embodiment of the invention in which a plurality of input terminals 11 are provided for coupling to the incoming video channels to be switched. Each such input terminal 11 is coupled via a resistance 12 to the base electrode of a transistor 13, and via a resistance 14 to ground potential. Each of transistors 13 has its collector electrode coupled directly to a source of negative direct current potential 15, and its emitter electrode coupled via a resistance 16 to a source of positive direct current potential 17, and via a capacitance 18 and a diode 19 to a common junction point 21. The cathode electrode of each diode 19 is coupled via a resistance 22 to a source of negative direct current potential 23. Each input terminal 24, for receiving standard logic signals to control the switching of the invention, is coupled via diode 25 to the cathode electrode of diode 19. Common junction point 21 is coupled via the parallel combination of resistance 26 and capacitance 27 to the base electrode of transistor 28, and via resistances 29 and 31 to a source of negative direct current potential. A voltage clamping Zener diode 33 is coupled between the junction point of resistances 29 and 31, and ground potential. Transistor 28 has its collector electrode coupled to a source of negative direct current potential 34, and its emitter electrode coupled via resistance 35 to ground potential. Output terminal 36 is coupled via capacitance 37 to the emitter electrode of transistor 28. It is to be understood that there will be as many pairs of input terminals 11 and 24 and following associated circuitry coupled to common junction point 21, as there are input video channels for possible switching to the single output terminal 36. The portion of dashed-line conductor between the anode electrode of one of the diodes 19 and common junction point 21 is intended to indicate that many more input video channels than the three shown may be utilized.

A suitable embodiment of the invention having eight input channels has been constructed and satisfactorily tested utilizing the following components, values, and potentials:

| | |
|---|---|
| Transistors **13** and **28** | 2N1195. |
| Diodes **19** and **25** | FD–100 (Fairchild). |
| Diode **33** | 3.3 volt Zener. |
| Capacitances **18** and **37** | 0.1 mmfd. |
| Capacitance **27** | 220 mmfd. |
| Resistances **12** and **26** | 330 ohms. |
| Resistances **14** | 47 ohms. |
| Resistances **16** | 1500 ohms. |
| Resistances **22** | 6800 ohms. |
| Resistance **29** | 470 ohms. |
| Resistance **31** | 220 ohms. |
| Resistance **35** | 680 ohms. |
| Potential sources **15**, **32** and **34** | —8 volts D.C. |
| Potential sources **17** | +8 volts D.C. |
| Potential sources **23** | —28 volts D.C. |
| Input logic level to "open" gate | —8 volts D.C. |
| Input logic level to maintain gate "closed" | 0 volts. |

It is to be understood that these particular components and values are presented only for illustrative purposes and are not intended to limit the scope of the invention in any way.

Considering the functional significance of the various components in the embodiment shown, the input emitter follower transistors 13 form buffers between the input video cables which would be coupled to input terminals 11 and the control gates comprised of diodes 19 and 25. In each of the input channels resistance 14 terminates the input cable coupled to terminal 11 in its characteristic impedance and provides a direct current return path of the base electrode of associated emitter-follower transistor 13. Resistance 12 also performs two functions, one being to stabilize transistor 13 over a wide frequency band and the other, to maintain a reasonably high impedance in shunt with resistance 14; this is necessary because at high frequencies the input impedance of transistor 13 becomes small and without resistance 12 the cable mismatch would become excessive. Capacitance 18 couples the input video signal information from transistor 13 to the control gate diodes 19 and 25. This alternating current coupling is necessary in order to separate the transistor bias voltage from the control gate diode bias voltage. The values of resistances 22 and 29 are chosen so as to forward bias gating diode 19 in its linear transfer region in order that the small amplitude video information input signal may be transmitted thereacross with a minimum of distortion. The bias network of resistances 29 and 31 and Zener diode 33 is common to all of the individual input channel gating diodes 19, and as a safety factor can compensate for the accidental opening of two of these gating diodes simultaneously without this condition affecting the bias potential of the other closed gating diodes 19. In addition, this network also provides the necessary bias potential for the output emitter-follower line driving transistor 28, which provides isolation between the plurality of input video gating channels and the output line which couples to terminal 36. Resistance 26 provides stability and high frequency compensation for transistor 28. Capacitance 27 in conjunction with resistance 26 form a high frequency compensation network which aids in increasing the overall frequency response of the invention.

*Operation*

With reference to the figure of drawing, and assuming for purposes of description that the components and potentials previously set forth for illustrative purposes are being utilized therein, the operation of the invention occurs in the following manner. It is desired to selectively switch one of the plurality of video frequency input signals coupled to respective input terminals 11, to the single output terminal 36 for utilization in following circuitry. This is to be accomplished by application of standard logic signals to the various input terminals 24. Only one input video channel is intended to be placed in an "ON" condition (i.e., coupled to output terminal 36) at any point in time; all other channels are to be maintained in an "OFF" or blocked condition. Logic circuitry not considered to be a part of this invention is coupled to input logic control terminals 24 and, after determining which single channel is to be placed in an "ON" condition, applies a standard −8 volt direct current logic signal to the terminal 24 associated with that channel, and simultaneously applies a standard logic signal of zero volts, or ground potential, to all other terminals 24 to place the channels associated therewith in an "OFF" or closed condition for the duration of such logic signals.

Assuming that the uppermost channel in the figure of drawing has been selected by the logic circuitry to be placed in an "ON" condition for the period under consideration and all other channels (two others shown in the figure of drawing) to be placed in an "OFF" condition, the logic circuitry would apply a standard logic signal of −8 volts to terminal 24 of the uppermost channel and a standard logic signal of zero volts (or ground potential) to all other terminals 24. Considering the figure of drawing with these logic potentials present on the respective terminals 24, the following relative potentials exist. First, with respect to the uppermost channel which has the −8 volt, or "ON," potential applied to its terminal 24, this −8 volt bias causes diode 25 in this channel to be reverse biased thus allowing associated diode 19 to remain forward biased as will be seen. This forward biased diode 19 has a direct current flow therethrough of approximately 3.3 milliamperes determined by potential sources 23 and 32, Zener diode 33, and resistances 29 and 22. The potential at the junction of resistances 29 and 31 is held at −3.3 volts by Zener diode 33. Resistance 29 has a voltage drop thereacross of approximately 1.5 volts thus placing a potential of approximately −4.8 volts at common junction point 21 and the anode electrode of forward biased diode 19. Diode 19 has a potential drop thereacross of approximately 0.7 volt causing a potential of −5.5 volts to be present at the cathode electrode thereof and also at the cathode electrode of associated diode 25. Thus it can now be more clearly seen that diode 25 is reverse biased by the −8 volt logic signal applied to its anode electrode via terminal 24. Therefore, with diode 25 blocking or reverse biased and diode 19 conducting or forward biased, the video signal presented to input terminal 11 will be coupled via resistance 12, the base-emitter junction of transistor 13, capacitance 18, and diode 19 to common junction point 21, and from junction point 21 via the parallel network of resistance 26 and capacitance 27, the base-emitter junction of transistor 28, and capacitance 37 to output terminal 36. The uppermost input channel, therefore, is said to be in an "ON" condition and has an open path for the input video signal applied thereto traceable directly from its respective input terminal 11 to the common output terminal 36. Next, consider any one of the other input channels, all of which have a logic signal of zero volts applied to their respective control terminals 24. This zero or ground potential at the anode electrode of diode 25 is positive with respect to its cathode electrode thereby placing the diode in an "ON" or forward biased condition presenting a low shunt impedance path to ground for the video signal applied to input terminal 11 thereof. Assuming a voltage drop of approximately 0.7 volt across diode 25, the cathode electrodes of diodes 25 and 19 will both be held at −0.7 volt, and since the anode electrode of diode 19 cannot become more positive than −3.3 volts, as it is clamped at this maximum level by Zener diode 33, it is reverse biased thereby presenting a high impedance to the video signal applied to input terminal 11 associated therewith. Thus it can be seen that any video signal applied to a terminal 11 of an input channel having a logic signal of zero potential applied to its control terminal will be blocked by reverse biased diode 19 and shunted to ground via the low impedance condition of forward biased diode 25. Thus it has been shown that the disclosed embodiment of the invention may be controlled by the application of standard logic pulses to the various control terminals thereof to permit the passage of a single selected input video signal to the output terminal thereof while blocking all other input video signals therefrom.

It therefore becomes apparent from the foregoing description and annexed drawing that the invention, a solid state broadband video frequency switching circuit, is a useful and practical device having many applications in the field of electronics. The usefulness of the device is enhanced by its compatibility with existing standard logic circuitry and its outstanding frequency characteristics.

Obviously, many modifications and variations of the present invention are possible in the light of the above teachings. It is therefore to be understood that, within the scope of the appended claims, the invention may be practiced otherwise than as specifically described.

I claim:

1. A broadband video frequency switching circuit for independently controlling and switching any one of a plurality of video frequency input signals to a common output channel comprising:

a plurality of input channel means, each said input channel means having a charge carrier emission means with emitting, control, and collecting electrodes, said collecting electrode being coupled directly to a first source of direct current potential and said emitting electrode being resistively coupled to a second source of direct current potential, having a first input terminal means for receiving first video frequency input signals for possible passage through said input channel means, said first input terminal means being resistively coupled to said control electrode of said charge carrier emission means and being resistively coupled to ground potential, having a first diode gating means which, in conjunction with a second diode gating means, controls the passage of said first video frequency input signals therethrough, the cathode electrode of said first diode gating means being capacitively coupled to said emitting electrode of said charge carrier emission means and being resistively coupled to a third source of direct current potential, having a said second diode gating means whose cathode electrode is coupled to the cathode electrode of said first diode gating means, having a second input terminal means coupled to the anode electrode of said second diode gating means and being adapted to receive standard logic control signals to cause said first and second diode gating means to either pass or block said first video frequency input signals, and having an output terminal means coupled to the anode electrode of said first diode gating means for making available thereat any said first video frequency input signals permitted to pass said first diode gating means in response to said standard logic control signals; and a single output channel line driving means having an input terminal means coupled in common with said output terminal means of each of said input channel means for receiving therefrom any said first video frequency input signals which may have been caused to pass therethrough in response to said standard logic control signals, having a charge carrier emission means with emitting, control, and collecting electrodes, said collecting electrode thereof being coupled to a fourth source of direct current potential and said emitting electrode thereof being resistively coupled to ground potential, having a regulated source of direct current potential, said regulated source being resistively coupled to said input terminal means of said single output channel line driving means, having a resistance means coupled in a parallel combination with a capacitance means, said parallel combination being coupled between said input terminal means of said single output channel line driving means and said control electrode of said charge carrier emission means therein, and having an output terminal means capacitively coupled to said emitting electrode thereof for providing thereat said first video frequency input signals which have been permitted to pass through said plurality of input channel means.

2. A broadband video frequency switching circuit for independently controlling and switching any one of a plurality of video frequency input signals to a common output channel as set forth in claim 1 wherein said charge carrier emission means comprise transistor means.

3. A broadband video frequency switching circuit for independently controlling and switching any one of a plurality of video frequency input signals to a common output channel as set forth in claim 2 wherein said regulated source of direct current potential comprises a voltage regulating Zener diode having its cathode electrode coupled to ground potential and its anode electrode resistively coupled to a source of direct current potential.

4. A solid state, broadband video frequency switching circuit for independently controlling and switching any one of a plurality of video frequency input signals to a common output channel comprising:

a plurality of input channel means, each said input channel means having a transistor means with emitter, base, and collector electrodes, said collector electrode being coupled directly to a first source of direct current potential and said emitter electrode being resistively coupled to a second source of direct current potential, having a first input terminal means for receiving first video frequency input signals for possible passage through said input channel means, said first input terminal means being resistively coupled to said base electrode of said transistor means and being resistively coupled to ground potential, having a first diode gating means which, in conjunction with a second diode gating means, controls the passage of said first video frequency input signals therethrough, the cathode electrode of said first diode gating means being capacitively coupled to said emitter electrode of said transistor means and being resistively coupled to a third source of direct current potential, having a said second diode gating means whose cathode electrode is coupled to the cathode electrode of said first diode gating means, having a second input terminal means coupled to the anode electrode of said second diode gating means and being adapted to receive standard logic control signals to cause said first and second diode gating means to either pass or block said first video frequency input signals, and having an output terminal means coupled to the anode electrode of said first diode gating means for making available thereat any said first video frequency input signals permitted to pass said first diode gating means in response to said standard logic control signals; and a single output channel line driving means having an input terminal means coupled in common with said output terminal means of each of said input channel means for receiving therefrom any said first video frequency input signals which may have been caused to pass therethrough in response to said standard logic control signals, having a transistor means with emitter, base, and collector electrodes, said collector electrode thereof being coupled to a fourth source of direct current potential and said emitter electrode thereof being resistively coupled to ground potential, having a regulated source of direct current potential, said regulated source being resistively coupled to said input terminal means of said single output channel line driving means, having a resistance means coupled in a parallel combination with a capacitance means, said parallel combination being coupled between said input terminal means of said single output channel line driving means and said base electrode of said transistor means therein, and having an output terminal means capacitively coupled to said emitter electrode thereof for providing thereat said first video frequency input signals which have been permitted to pass through said plurality of input channel means.

5. A solid state broadband video frequency switching circuit for independently controlling and switching any one of a plurality of video frequency input signals to a common output channel as set forth in claim 4 wherein said regulated source of direct current potential comprises a voltage regulating Zener diode having its cathode electrode coupled to ground potential and its anode electrode resistively coupled to a source of direct current potential.

References Cited by the Examiner

UNITED STATES PATENTS

| | | | |
|---|---|---|---|
| 2,685,039 | 7/1954 | Scarbrough et al. | 307—88.5 X |
| 3,052,849 | 9/1962 | McCurdy et al. | 328—104 X |
| 3,135,873 | 6/1964 | Werme | 307—88.5 |

OTHER REFERENCES

Marsocci, "Survey of Semiconductor Devices . . . ," Semiconductor Products (mag.), January 1961 (pages 31 to 37), (pages 31 and 32 relied on).

JOHN W. HUCKERT, *Primary Examiner.*

ARTHUR GAUSS, *Examiner.*

D. D. FORRER, *Assistant Examiner.*